United States Patent [19]
Prydtz et al.

[11] Patent Number: 5,566,834
[45] Date of Patent: Oct. 22, 1996

[54] METHOD AND SYSTEM FOR TRANSPORT OF GOOD AND LUGGAGE IN AN AIRPORT OR SIMILAR FACILITY

[75] Inventors: Ole Prydtz, Hjortshoej; Ralph Kofoed, Hornslet, both of Denmark

[73] Assignee: Kosan Crisplant A/S, Aarhus, Denmark

[21] Appl. No.: 471,691

[22] Filed: Jun. 6, 1995

Related U.S. Application Data

[63] Continuation of Ser. No. 743,418, Aug. 26, 1991, abandoned.

[30] Foreign Application Priority Data

Feb. 24, 1989 [DK] Denmark .................................. 0861/89

[51] Int. Cl.⁶ .............................. B07C 5/00; B65G 47/10
[52] U.S. Cl. ........................... 209/559; 209/569; 209/917; 198/349.1; 198/349.6
[58] Field of Search ............................ 209/3.1, 546, 552, 209/559, 567, 569, 576, 577, 583, 917, 923; 198/348, 349, 349.1, 349.6, 350, 354

[56] References Cited

U.S. PATENT DOCUMENTS

| | | | |
|---|---|---|---|
| 3,511,372 | 5/1970 | Kantarian et al. | 209/583 X |
| 3,610,159 | 10/1971 | Fickenscher | 198/349 X |
| 3,695,462 | 10/1972 | Sullivan | 198/350 X |
| 3,915,284 | 10/1975 | Knockeart et al. | 198/349.6 X |
| 5,040,660 | 8/1991 | Ohta et al. | 198/354 X |

FOREIGN PATENT DOCUMENTS 2224147  4/1990  United Kingdom .................... 209/3.3

Primary Examiner—H. Grant Skaggs
Assistant Examiner—Tuan Nguyen
Attorney, Agent, or Firm—Antonelli, Terry, Stout & Kraus

[57] ABSTRACT

In airports, large amounts of luggage have to be sorted and transported. Departing the luggage comes from check-in areas (14) to various finger conveyors (4) that radiate from a central area. A large amount of transit luggage must be handled directly between different finger conveyors (4). Arriving luggage comes from the finger conveyors for delivery to a central delivery area. The invention provides for a transportation system having a high degree of simplicity and clearness both in construction and in operative control. A central rotating conveyor system (2) receives luggage both from the check-in areas (14) and from individual conveyor loops (4) that extend along the separate finger conveyors, whereby departing luggage, as well as transit luggage can easily be sorted out to the correct finger conveyors (4), and arriving luggage conveyed to the central delivery area. The transportation along the finger conveyors (4) is effected by means of carts (26), each having carrier sections (32) for conveying luggage to a selected destination. These carts are advanced with high velocity along the long stretches, but with a low velocity through the areas in which luggage is to be loaded or selectively unloaded.

8 Claims, 3 Drawing Sheets

METHOD AND SYSTEM FOR TRANSPORT OF GOOD AND LUGGAGE IN AN AIRPORT OR SIMILAR FACILITY This is a continuation of U.S. patent application Ser. No. 07/743,418, filed Aug. 26, 1991, now abandoned.

BACKGROUND OF THE INVENTION

The present invention relates to an internal goods transportation system primarily for freight and luggage transport in large airports. In large airports it is usual to make use of so-called 'fingers' that extend along or out to stands for several airplanes and that radiate from a central terminal area for passengers and their luggage. The terminal area, at least in principle, is divided into three main areas, viz. a departure, an arrival and a transit area. In the departure area a transport system is arranged for reception of luggage at the check-in positions and for feeding the luggage to a sorter system, in which the luggage is sorted out to the various stands and then moved to the latter in containers. In the arrival area is arranged one or more presentation belts, on which arriving luggage is presented to the passengers, and to which the luggage is moved in containers from the separate arrived airplanes. The transit area normally has no corresponding or associated conveying system, as containers with arrived luggage can be moved to the sorter system in which the luggage may then be sorted out to the respective new destinations together with luggage from the area of departure.

The associated luggage transport in tractor driven containers is very heavy in large airports, and long ago it has been desired and proposed to automate the transport extensively. At a principal level this is very easy, e.g. by imitating such already developed transport systems, in which taxi cabs under automatic control can be moved through the shortest distance from any point in the system to any other point therein, just as the nearest empty cab can be called to any place. Thus it would be possible to replace the containers by a large number of small carts, each for holding a few pieces of luggage, which may then be guided under computer control to the arrival area or direct to the new stand in case of transit luggage. However, more practical investigations show that such a system with its associated high number of rail switches will be practically impossible to control in an effective manner, inter alia because it is a particular complication that within relatively brief periods of time intensive traffic should be established from or to certain stands, and this traffic pattern may shift rapidly, or rather be repeated for other combinations of stands. It is a superior requirement that the luggage transport be effected safely and rapidity, and it has been found that for such a conveying system in a large airport it is practically impossible to calculate the relation between the number of single carts and the desired or the actual conveying capacity, this being highly inconvenient in the planning of work.

SUMMARY OF THE INVENTION

It is the purpose of the invention to provide a conveying system for the discussed use, wherein use is made of such conveying means and ways that the system can be designed with a high degree of systematism, which will condition both a large capacity with relatively simple means and control equipment, and not least a good possibility of a well defined relation between the size and the capacity of the system.

According to the invention an extended use is made of the said sorting conveyor, inasfar as this conveyor is brought to represent the said transit area; it cooperates with conveying means, which in closed loops serves each one of the 'fingers', and with other conveying means that are conveying from the departure area and to the area of arrival, respectively. Thus, a rotating sorting conveyor may be used, which at one or more places receives luggage from the departure area and moves the luggage around, past transfer joints for the conveying means serving the single fingers, where the luggage may then, based on a very simple destination coding, be guided out to the respective correct fingers. Transit luggage will be received from the various fingers and will be moved around in the 'transit sorter' until it arrives at the transfer joint belonging to the relevant new finger, i.e. the entire transit transport will take place in a simple and systematic manner along rather few different, one-way directed conveying paths, which will be adaptable to desired capacities. Luggage to the arrival area is also fed to the transit sorter, on which the luggage from all the transfer joints of the 'finger conveyors' may be moved and transferred to the conveyor means leading to the area of arrival. Thus, the transit sorter may simultaneously handle departing luggage, transit luggage, and arriving luggage.

However, for relieving the transit sorter it may be preferred that luggage to be transferred from the 'finger conveyor' to the area of arrival be transferred directly from the separate finger conveyors to the conveyor means leading to the area of arrival, whereby—also from a control point of view—it is easier to bring the luggage from the separate fingers to separate sub areas in the area of arrival, e.g. corresponding to separate airplane arrivals.

In connection with the invention it is a special circumstance that the separate 'fingers' can be very long, and it may be unrealistic, therefore, to make use of coherent or continuous transportation means for the outbound and the inbound transport in the separate associated transport loops. Simple conveyor belts cannot be used, as the luggage with associated destination coding should be loaded onto well defined carrier areas of the conveyor for inbound transport, such that the luggage may be unloaded with a corresponding accuracy onto the transit sorter, preferably by a movement crosswise thereover. Besides, the demand for a rapid movement of the luggage along the long fingers is not compatible with the means of transportation being moved correspondingly rapidly through the areas, in which the luggage is loaded and unloaded, respectively. With the use of the said, proposed single carts it is easily achievable that such carts may stand still both for loading and unloading, while otherwise they can be moved with high speed in the transport system; however, even though it would be a usable solution to employ such carts in the separate, closed finger transport loops according to the invention, then the solution would nevertheless be unsuitable for various practical reasons, this being explained in more detail below.

With this background, in connection with the invention it is preferred to make use of longer, mutually separated 'train carts' each having a row of a number of carrier platforms for single pieces of luggage, these platforms being adapted in such a manner that the luggage can be unloaded individually therefrom, e.g. when passing the transit sorter and the area from which the luggage is guided to the area of arrival, respectively. Such loader train carts can be driven more simpler and safely than a correspondingly increased number of separate carts, and they are cheaper to manufacture.

It is also a particular circumstance that the said transit sorter in practice, in a really large airport, should Be constructed with more parallel conveyor tracks, which may each be more or less permanently assigned to the respective separate finger conveyors, while on the other hand the conveyors should be able to deliver luggage to any of the parallel conveyor tracks of the transit conveyor. It has been found particularly advantageous that the said carrier platforms in the train carts be laterally tiltable in an individually controllable manner, such that according to the associated destination code they can be tilted for unloading the luggage to only that one of the transit sorter tracks which will bring the luggage for delivery to the outgoing conveying means of the relevant new finger in the system. Thus, also the finger conveyors should be laid out as sorter conveyors.

BRIEF DESCRIPTION OF THE DRAWINGS

In the following the invention is described in more detail with reference to the drawing, in which.

DETAILED DESCRIPTION OF PREFERRED EMBODIMENTS

Figure 1:
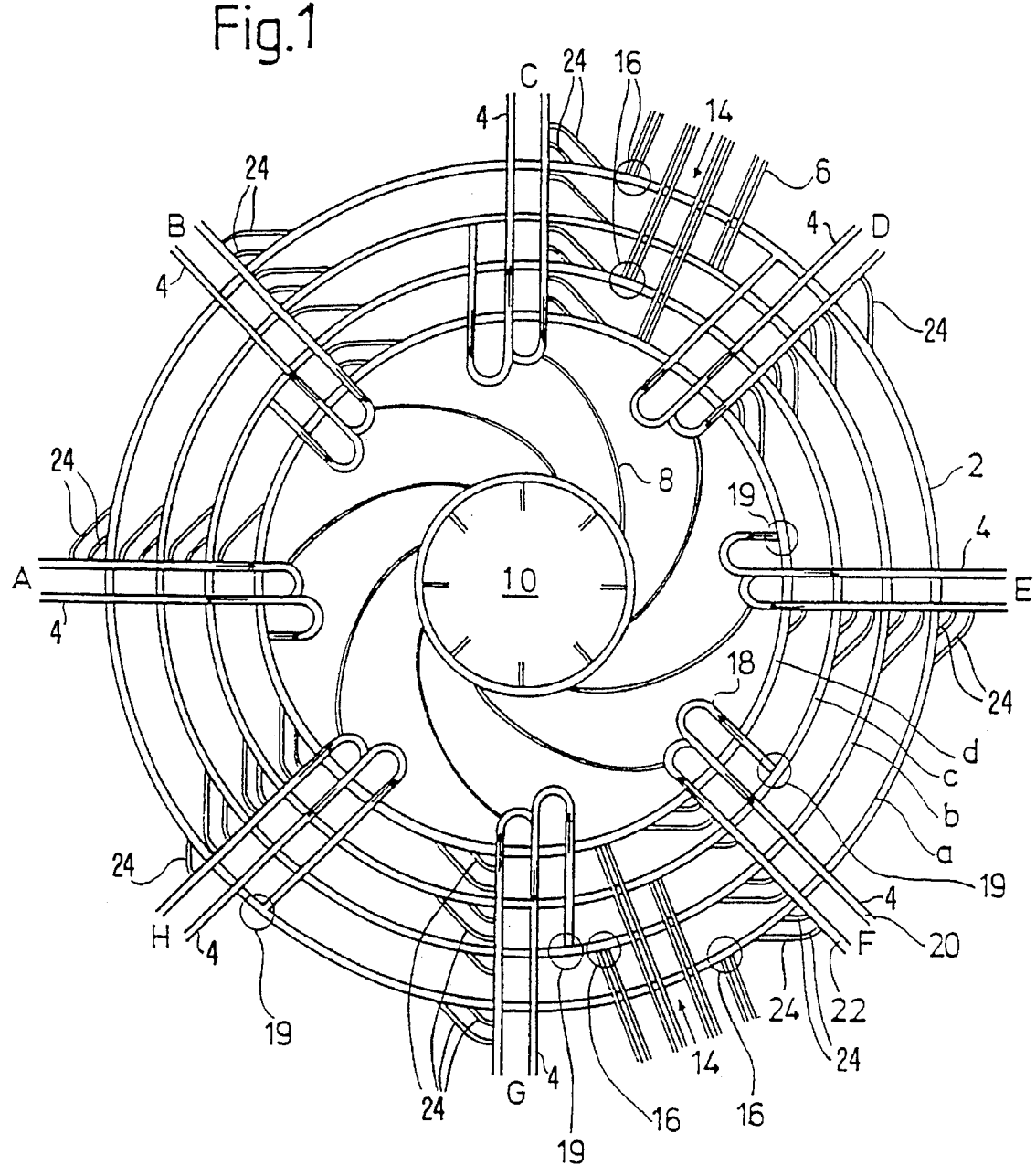
FIG. 1 is a schematic general view of a conveyor system according to the invention.
Figure 2:
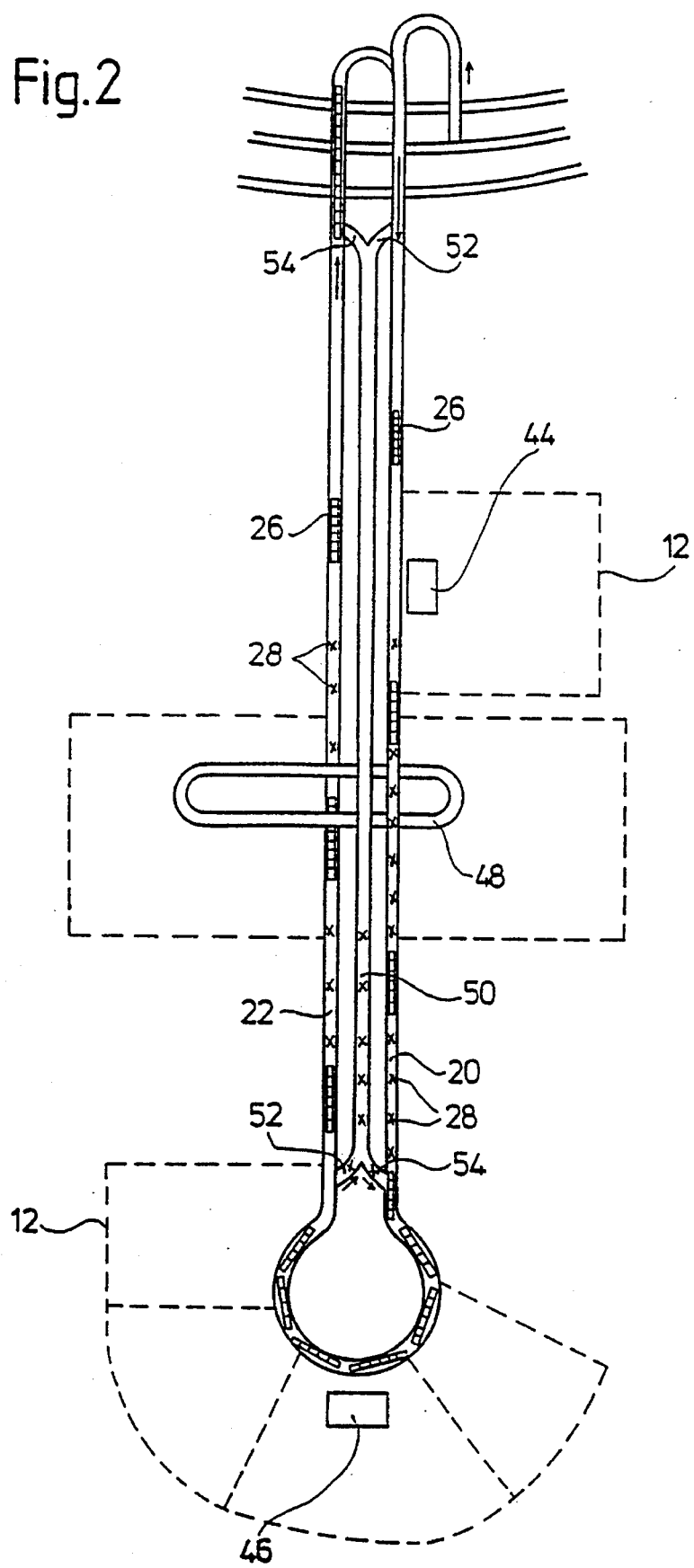
FIG. 2 is a corresponding view of a 'finger conveyor system'.

The system shown in FIG. 1 comprises, as main parts, a rotating conveyor system 2 shown as laid out with four strings, designated a, b, c, and d, and with a number of finger conveyor systems 4 radiating radially therefrom, one or more feeding conveyors or conveyer groups 6 for ingoing feeding of goods to the round system 2, and a number of conveyors 8 arranged for bringing goods from the round system 2 or from the finger conveyors inwardly to a central delivery area 10. The finger conveyor systems 4 are designated A–H and stretch from the illustrated central area of an airport complex outwardly along radiating 'fingers' for passenger traffic to and from stands for airplanes along these fingers or at the outer ends thereof. A single one of these systems 4 is illustrated in FIG. 2, where different stands are indicated by dotted frame lines 12.

The feeding conveyors 6 extend from check-in areas 14 to the respective strings a–d in the round system 2. In each of these strings is provided a continually operating sorter conveyor, i.e., a conveyor which can receive goods, primarily luggage, from the feeding conveyors and bring the goods to individually coded unloading stations for transfer of the goods onto selected finger conveyors 4. The transfer of the goods onto the round conveyors a–d takes place in areas 16, and the unloading from these conveyor strings a–d to the outwardly directed stretches of the finger conveyors is effected via particular conveyor means described below. In a non-illustrated, but well known manner the sorters a–d are made with or as a row of single trays which can each receive one or a few articles and which are each controllable to tilt off the goods when passing respective coded unloading locations, so that on passing of the inlet ends of transfer conveyors 18, tilting will transfer the goods to the outwardly moving stretches of the finger conveyors 4, A–H.

In principle it would be possible to transfer goods from any one of the ring sorters 2 a–d to any of the crossing, outwardly moving finger conveyor stretches 20, viz. in all of the respective crossings, but in practice this would cause difficulties for various reasons, inter alia because the ring sorters a–d ought to be moved with such a high speed that delivery of goods immediately at the crossing areas would be unsafe or require special transfer installations. In the system shown such special transfer installation for each finger conveyor A–H is mounted only at a single one of the ring sorters 2 a–d, viz. at the said inlet end 19 of the respective transfer conveyors 18. There is shown four ring sorters 2 a–d and eight finger conveyors 4 A–H, and it will be observed that each of the ring sorters, via the conveyors 18, is operatively connected with two diametrically opposite finger conveyors 4,20. Thus, for instance, the ring sorter 2c is connected only to the transfer conveyors 18 which lead to the finger conveyors 4F and 4B.

The transfer conveyors 18 can be simple belt conveyors that move the goods or luggage from the receiving areas 19 axially onto the respective outwardly moving finger conveyors 20, whereby the delivery to these conveyors may take place in a safe and accurate manner.

In an associated control system it is possible in an easy manner to assign a destination code to each goods unit loaded in at the check-in areas 14, to the effect that the unit will be unloaded onto the outwardly directed conveyor string 20 of only that finger conveyor system which corresponds to or with the relevant final unloading position of the unit, i.e. a position near the stand of the relevant departing airplane. The rotating system 2 will thus take over the sorting work otherwise effected by conventional sorters for separating the luggage to various specific containers, but it will be noted that the use of such containers is made superfluous because the luggage can be transferred via the system 2 direct for piece by piece delivery to the outleading string 20 in the relevant finger conveyor 4.

Each finger conveyor 4 is arranged with or as an endless conveyor loop having, as mentioned, an outleading string 20 and an inwardly leading string 22. Luggage from arriving airplanes at the stands may thus be loaded onto the home-leading strings and at that occasion be coded in for delivery, in case of transit luggage, to the outleading string of any of the other finger conveyors 4. Goods for the central delivery area 10 will need no such coding, as they will automatically be transferred to the respective inner conveyors 8, if not already delivered to one of the ring sorters 2.

Owing to the fact that each of the various finger conveyors 4 is operatively coupled to a specific ring sorter 2 as far as outward delivery is concerned, it will be a requirement that goods can be transferred from the homeleading finger conveyor strings 22 to each separate one of the ring sorters 2, and since an immediate transfer at the very crossings will also be difficult to arrange due to the relatively high speed of the ring sorters, there is provided at each of the crossings a particular sub transit conveyor 24 that can receive goods in a selective manner from the finger strings 22 and deliver the goods to the selected ring sorter 2 in an operatively safe manner, e.g., as indicated, by delivering the goods to the ring sorter at an oblique inlet angle.

It is required hereby that also the finger conveyors are laid cut as sorters (sorting conveyors), because they shall be able to unload the single units of goods to the various sub transit conveyors 24. In return, however, all the transit luggage can then be handled by the same conveying and sorting systems that are used for bringing luggage outwardly from the check-in areas and for bringing luggage inwardly from the stands to the central delivery area.

It will be appreciated that the coding and the controlling of the transfer of the transit goods may be provided for in a very simple manner, as only two parameters are relevant, viz. the number of the ring sorter 2, onto which the goods should be unloaded, and the number of the finger conveyor or the area of delivery to which the goods should thereafter be delivered. In further specialized system a further information may be added, viz. the number of the stand adjacent the selected finger, at which the luggage should be unloaded in order for this to take place as close as possible to the separate airplanes. Evidently, however, with the use of a suitably designed control central, it will not be necessary to read in these specific data, but just the so-called flight number of the relevant departing airplane.

With the system shown it is possible to calculate or adjust the capacity of the system in a very simple manner, as the capacity will be widely determined by the length and the moving speed of the ring sorters 2a–d.

In a very large airport the said fingers or most of them will be very long, and since the finger conveyors 4 should be laid out as sorters for being able to deliver the luggage selectively to the various ring sorters 2 these finger sorters, therefore, should be very long and could be extremely expensive. With the use of conventional sorter conveyors the further problem would occur that the low moving speed required at the loading and unloading places would condition, generally, such a low conveying velocity on the long stretch that it would take far too long a time for the luggage to be brought in and therewith also out. It could be a solution to make use of the said individual carts, here designed as sorter carts, with the advantage that such carts could be moved in closed systems so as to not give rise to the said control problems. Such carts may be driven individually, e.g. by means of linear motors along the route, and thereby they can be moved slowly at the loading and unloading areas, but fast and with mutual spacing along the long stretches, and the number of carts can be substantially reduced compared with a continuous row of carrier platforms in a continuous sorter conveyor extending along the long stretches.

For the economy of such a system it will be decisive how the driving means are designed, and even though the invention is not restricted to any particular technique in this respect it is nonetheless presumed that linear motors will be preferable. A linear motor could be placed on each cart for cooperation with an elongated rail, but this would require a non-attractive commutation along the rail for powering the motors, just as it would require a high number of motors. A simpler solution is to use stationary linear motors that are placed with a relatively large mutual spacing along the driving track or tracks of the carts, such that the carts by each passage of a motor will be given a push that is sufficient to bring the cart forwardly to the next motor, and so forth. The spacing between the motors may well amount to several cart lengths, such that the number of motors can be kept relatively low, but the problem will arise that after a current supply failure it will be extremely difficult to get the system restarted, because it will be necessary to restart lots of carts manually.

According to the invention this problem has been solved by using, instead of single carts, sorter carts each consisting of a single drivable unit laid out with a row of a reasonable number of carrier platforms, e.g. corresponding to 10–15 built together single carts. These semilong carts will constitute a compromise between single carts, which for a good operational economy and a good restartability would require a high number of linear motors, and a continuous conveyor, which due to its considerable length would require an unnecessarily high number of single platforms that could not be moved with a desirable high velocity along the free conveying stretches. The loss of capacity connected with the use of carts that may hold 10–20 pieces of luggage will be quite small, as a series of such carts may be loaded with an effective utilization of the total carrier capacity in connection with each airplane arrival and departure, and the relatively large length of these cart units implies that the carts at any place of their conveying paths can be in operative engagement with a driving linear motor, even when these motors are placed with a relatively large mutual spacing, i.e. the carts in the entire system will be able to be restarted automatically and immediately after an occurring current failure, without the motors having to be arranged close to each other in large numbers.

It will only be required, then, that the single platforms on the carts be designed such that they can be selectively actuated to effect unloading or tilting off of the luggage, for instance such that two consecutive platforms can deliver the luggage at two different places, namely by their passage to the respective crossing ring sorters 2a–d or the respective feeding conveyors 24 for these sorters. This, however, is no particular problem, inasfar as each single cart unit can be compared with a partial length of a sorter conveyor having a row of individual platforms, from which the conveyed goods may be unloaded by tilting or otherwise. The only difference is that the sorter conveyor is sub-divided in a row of individually movable 'multi units', which can be moved with a high speed and with large mutual spacing along the long and in principle straight conveyor stretches, while at the relevant loading and unloading areas they can be moved with a required low speed.

Figure 3:
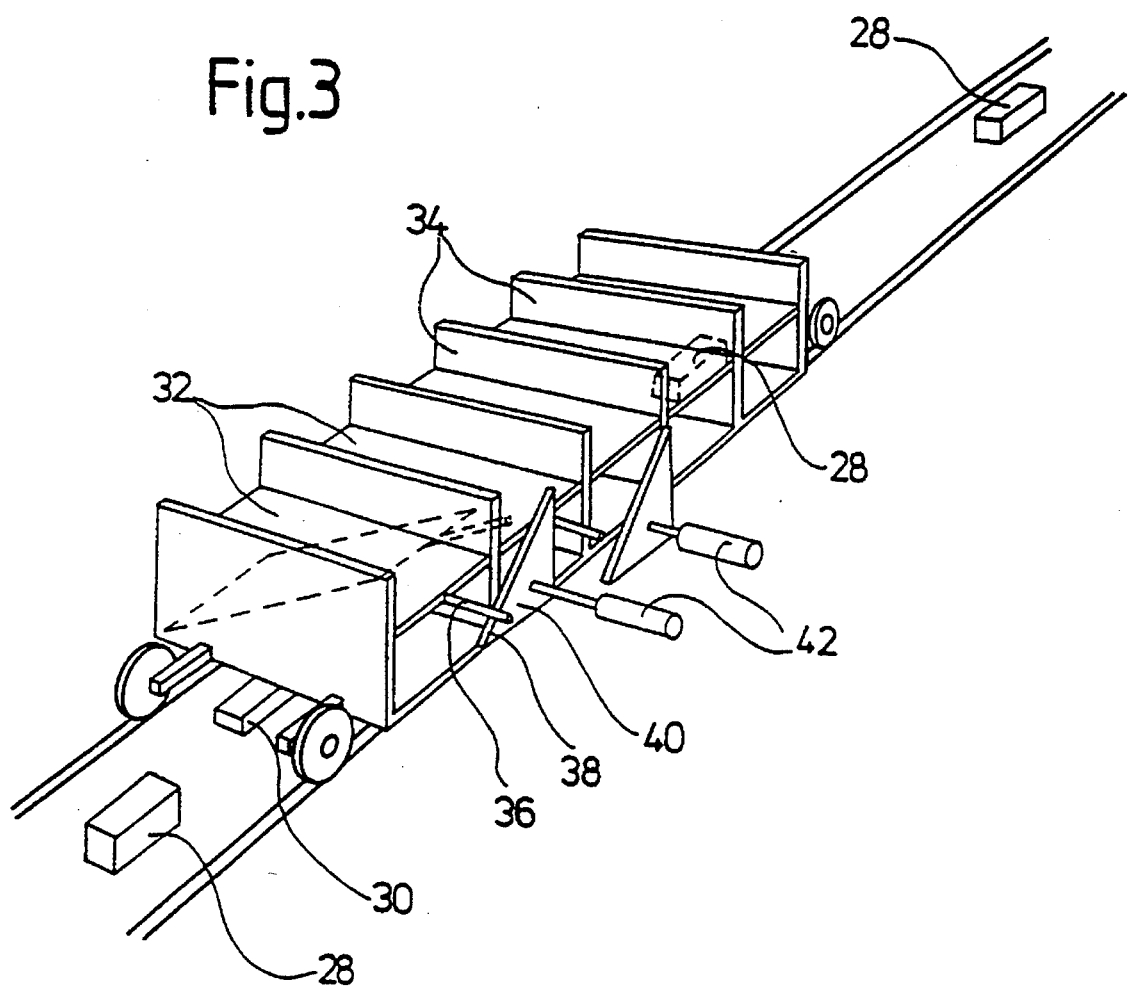
FIG. 3 is a perspective view of a cart for use in this system.

A number of such multisorter carts 26 is shown in FIG. 2, while a single such cart is shown in FIG. 3, which also illustrates the application of driving linear motors 28 mounted locally along the middle of the respective conveyor string 20 or 22, one of these strings in FIG. 3 being represented by driving rails for the wheel-mounted carts. The motors 28 cooperate with traction rails 30 mounted in the longitudinal direction below the middle of the carts, optionally slightly protruding therefrom as shown, and the mutual distance between the motors 28 should just be slightly less than the length of these rails, such that each cart is always in driving connection with at least one motor. Hereby all the carts can start automatically after a possible current failure.

In principle the carts may be arranged as shown in FIG. 3, viz. with a row of carrier platforms 32 mounted between rigid partitions 34 and each being tiltable to at least one side for unloading of luggage therefrom, namely to the sub transit conveyors 24. Nowhere in the entire conveyor loop will there be any need of unloading towards the inside of the loop, such that the carts and the associated actuator means for the tilting off of the luggage at the conveyors 24 should be adapted for monolateral operation only. By way of example, each platform 32 can have a pin 36 projecting therefrom at the inner side of the loop, such pins being operable to be forced upwardly when passing the single sub transit conveyors, viz, by passing along a guiding cam 38 of an actuator plate 40 that has been displaced laterally by means of a working cylinder 42 into the moving path of the pins 36 from an inoperative position retracted therefrom. The platforms thus tilted may be tilted back to the horizontal by themselves or preferably by their passage of a rigid return tilting cam mounted after the last of the transit conveyors 24 or rather just after the branching off position of the conveyor 8 leading to the central area 10, since at that position there may be arranged a fixed tilt-up cam that will cause all remaining horizontal platforms 32 to tilt up for unloading of all luggage which has not already been unloaded to the transit conveyors. Thereafter care should be taken that all the platforms are tilted back to horizontal before they reenter the respective areas in which they receive outbound goods from the conveyors 18.

The same tilting function can be utilized for the unloading of the outwardly conveyed luggage, whether the unloading is effected in a consequent manner at an outer unloading position or in a selective manner at various places of the finger, e.g. each at a side area 44 or at outer common area 46. In special cases an unloading may even be effected to a crosswise arranged conveyor 48 that can take the luggage to a position at some distance from the finger and of course also take luggage from that position to the inwardly directed conveyor string 22.

In FIG. 2 it is clearly shown that on the long stretches the carts 26 may be conveyed with a rather large mutual spacing, and they can be driven at high speed, while in the inner and outer loading and unloading stations they can be conveyed with low speed and even be stopped for a short while, whereby the carts will be stowed together. The system is easy to control such that carts passing loading or unloading stations 44,48 located at the long stretches are decelerated to a reasonably low speed during such passages.

From a control point of view it is relatively easy to arrange for the desired selective transfer of arriving goods to the transit conveyors 24, viz. with the use of a simple computer, which, when the luggage is placed on the single platforms 32, is informed of the destination of the luggage. Particularly because the conveyor forms a closed loop it is easy for the computer to keep in check the identity of the cans, such that the luggage already loaded can be delivered with high accuracy to the relevant transit conveyors 24. In the relevant transfer area, of course, sensors should be provided for detecting the arrival and the correct positioning of the carts for effective activation of the respective actuator means 40 for the unloading function. The carts may be provided with an identification coding, which is detected in both the loading and the unloading areas.

This can be particularly implemented in a preferred embodiment of the invention, where care is taken that in each separate one of the closed finger loops 4 there are employed as few cans as possible for satisfying the momentary capacity requirement, whilst an increasing demand for capacity is satisfied by adding further carts from an accumulation area. In this manner it can be ensured that the length transport can take place with maximum speed, viz. with high speed for low capacity requirements and a reduced high speed or increased duration for higher capacity requirements. The loop, therefore, should be connected with an accumulation string that can deliver and receive further carts to and from the loop, respectively.

In FIG. 2 it is shown that such an accumulation string 50 can be arranged parallel with the strings 20 and 22 in the space therebetween and be connected with respective inlet and outlet tracks 52 and 54 for communication with the respective inwardly and outwardly conveying string of the finger conveyor 4, through suitable rail switches. For the accumulation aspect alone it could be sufficient that the string 50 extend along a partial length of the strings 20,22, but for the operational security of the system it is advantageous that there is arranged, along the full length of these strings, a parallel string that may be used in case of a blocking of one of the main strings, e.g. by an occurring cart breakdown. As shown in FIG. 2, therefore, there are arranged inlet and outlet tracks 52,54 at both ends of of the intermediate string 50, such that the latter may act both as a reserve string and as an accumulation string.

In the entire system the operational safety should be given a very high priority, so even in the rotational sorter system 2, as well as at the transit conveyors 24, should be arranged one or more parallel conveyors that can be placed in use should a failure in one of the ordinary conveyors arise.

It will be appreciated that the ring sorters 2*a*–*d* should not necessarily be constituted by continuous sorting conveyors, that is conveyors with individual platforms mounted immediately next to each other all the way round. It may even be undesirable that the outermost ring sorter, due to its larger diameter, should have a capacity much larger than the innermost ring sorter, and the system may be arranged such that the number of sorter platforms in the different ring sorters is the same, whereby it is easier to calculate the capacity of the system. If the sorter platforms or trays in the inner ring sorter 2*d* are placed directly side by side, they may thus be arranged with increased mutual spacing in the outer ring sorters, or sorter tray trains may be used having the same length as in the innermost ring sorter, but with a spacing between the front and the rear end thereof. Alternatively individual 'multi tray carts' 26 as indicated in FIGS. 2 and 3 may be used in the ring sorters, whereby identical or any other numbers of carts may be placed right away in the single ring sorter strings 2.

In FIG. 1 is shown a strictly symmetrical layout of the conveyor system, but in practice, of course, the layout need not be that regular. What is important is that the finger conveyors do not connect directly with each other, but only through the central ring sorter system 2, whereby the system can be laid out based on simple logistics with respect to both the material system and the control system for the functioning of the system.

It should be emphasized that the sorter conveyors included in the system according to the invention should not necessarily, themselves, be provided with with means for unloading the goods; it is perfectly possible to make use of permanently horizontal carrier platforms, from which the goods may be unloaded by pushing off by means of pusher members arranged stationarily at the respective unloading places. This is particularly relevant, because normally there will be no unloading places in which the goods should be unloadable to both sides, i.e. the pushing means may by be rigidly mounted and thus permit a very simple design of all the sorter conveyors and sorter carts in the system. On the other hand it is of course important that in all these local systems it is accurately supervised when the coded carrier sections arrive at the respective relevant unloading positions for a correct actuation of the unloading means, and even though the conveyors themselves may thus be of a quite simple design they will nevertheless constitute real 'sorter conveyors'.

The system may be widely modified with respect to the executed sorting functions. In the example shown the number of rotating parallel conveyors in the system 2 could be expanded to eight, whereby each of the ring sorters could deliver goods to but a single one of finger conveyor loops 4. Hereby the ring sorters could not be designated 'sorting conveyors', as they would only serve to bring all on-loaded goods units to the respective associated finger conveyor. In return, however, it would be necessary, by the feeding from the check-in areas 14, to make use either of a correspondingly higher number of simple feeding conveyors 6, which would be conditioned by a previous separation of the luggage for each of the respective fingers, or the use of fewer supply sorter conveyors that can deliver the goods units selectively to the various ring conveyors in the system 2.

Likewise the system will of course not be limited to the single finger conveyors 4 being restricted to receive goods from a single one of the ring conveyors 2 through the respective conveyors 18; in principle it will be possible to selectively transfer goods units from any of the ring conveyors 2 to any of the outwardly directed strings 20 of the finger conveyors 4. Then it will not be a requirement that there be established a possibility of transfer (via 24) of goods from the single inwardly directed strings 22 to more than a single one or a few of the ring sorters in the system 2.

I claim:

1. A system for transporting goods and luggage within an airport-type facility, the facility including a central departure area, a plurality of outer departure areas, a plurality of outer arrival areas, and a central delivery area, said system comprising:

a rotating sorter conveyor system including a plurality of rotating conveyor loops;

a feeding conveyor, for transporting goods and luggage from the central departure area to said rotating sorter conveyor and selectively transferring the goods and luggage to selected ones of said plurality of rotating conveyor loops; and a plurality of endless loop string conveyors radiating outwardly from said rotating sorter conveyor to the plurality of outer departure areas and the plurality of outer arrival areas, each string conveyor including an outbound string for transporting goods and luggage from said rotating sorter conveyor to an associated outer departure area and an inbound string for transporting goods and luggage from an associated outer arrival area to said rotating sorter conveyor, said inbound string including means for selectively transferring goods and luggage, being transported from the outer arrival areas, to selected ones of said rotating conveyor loops.

2. A system for transporting goods and luggage within an airport type facility, the facility including a central departure area, a plurality of outer departure areas, a plurality of outer arrival areas, and a central delivery area, said system comprising:

a rotating sorter conveyor system including a plurality of rotating conveyor loops;

a feeding conveyor, for transporting goods and luggage from the central departure area to said rotating sorter conveyor and selectively transferring the goods and luggage to selected ones of said plurality of rotating conveyor loops;

a plurality of endless loop string conveyors radiating outwardly from said rotating sorter conveyor to the plurality of outer departure areas and the plurality of outer arrival areas, each string conveyor including an outbound string for transporting goods and luggage from said rotating sorter conveyor to an associated outer departure area and an inbound string for transporting goods and luggage from an associated outer arrival area to said rotating sorter conveyor; and a plurality of groups of transfer conveyors, each group associated with one of said plurality of endless loop string conveyors, each transfer conveyor connecting the inbound string of the associated endless loop string conveyor to a selected one of said rotating conveyor loops for selectively transferring goods and luggage, being transported from the outer arrival areas, to the selected one of said rotating conveyor loops.

3. A system as claimed in claim 2, wherein said feeding conveyor comprises a plurality of parallel feeding conveyor strings, each feeding conveyor string connected to a selected one of said rotating conveyor loops for transferring the goods and luggage to the selected one of said rotating conveyor loops.

4. A system as claimed in claim 2, further comprising a plurality of discharge conveyors, for discharging luggage and goods from the inbound strings of said endless loop string conveyors to the central delivery area.

5. A system as claimed in claim 4, wherein each discharge conveyor is connected to the inbound string of one of said endless loop string conveyors at a point downstream of the connection of the associated group of transfer conveyors to such inbound string, and wherein each discharge conveyor includes means for discharging any goods and luggage on the connected inbound string onto the discharge conveyor for transporting to the central delivery area.

6. A system as claimed in claim 2, wherein each of said endless loop string conveyors includes a plurality of cart units, each cart unit including a plurality of carrier sections, and means for transporting said cart units at a low velocity and with close spacing in areas adjacent said transfer conveyors, said discharge conveyors, the outer departure areas, and the outer arrival areas and for transporting said cart units at a higher speed and with greater spacing in other areas.

7. A system as claimed in claim 2, further comprising control equipment responsive to destination codes for the goods and luggage, for controlling discharge of the goods and luggage from said inbound strings to selected ones of said transfer conveyors and said discharge conveyors for transfer to a selected one of said rotating conveyor loops and the control delivery area, and for controlling discharge of goods and luggage from said rotating conveyor loops to a selected one of said outbound strings.

8. A system as claimed in claim 2, wherein each outbound string includes an inlet portion connecting one of said rotating conveyor loops to the outbound string.

* * * * *